US005241402A

United States Patent [19]

Aboujaoude et al.

[11] Patent Number: 5,241,402

[45] Date of Patent: Aug. 31, 1993

[54] CONCURRENT MODEM CONTROL IN A REPROGRAPHIC MACHINE

[75] Inventors: Jaoude F. Aboujaoude, W. Henrietta; Mark F. Enzien; Raju Sonty, both of Penfield; Robert L. Sklut, Rochester, all of N.Y.

[73] Assignee: Xerox Corporation, Stamford, Conn.

[21] Appl. No.: 771,882

[22] Filed: Oct. 7, 1991

Related U.S. Application Data

[63] Continuation of Ser. No. 445,809, Dec. 4, 1989.

[51] Int. Cl.[5] ........................ H04N 1/00; H04N 1/32; G03G 21/00

[52] U.S. Cl. .................................... 358/406; 358/401; 358/468; 355/202

[58] Field of Search ............... 358/400, 401, 405, 406, 358/434, 437, 442, 468, 296, 300; 355/202, 203, 204

[56] References Cited

U.S. PATENT DOCUMENTS

| | | | |
|---|---|---|---|
| 3,962,534 | 6/1976 | Ogawa | 358/406 |
| 4,112,467 | 9/1978 | Ogawa | 358/257 |
| 4,113,992 | 9/1978 | Gorham et al. | 358/440 |
| 4,167,322 | 9/1979 | Yano et al. | 355/204 |
| 4,632,538 | 12/1986 | Lemelson et al. | 358/300 |
| 4,646,160 | 2/1987 | Iizuka et al. | 358/257 |
| 4,686,526 | 8/1987 | Gritzo | 340/825.06 |
| 4,754,300 | 6/1988 | Fukae | 355/202 |
| 4,811,358 | 3/1989 | Smedley et al. | 375/8 |
| 4,849,815 | 7/1989 | Streck | 379/100 |
| 4,860,111 | 8/1989 | Shimizu et al. | 358/400 |
| 4,876,606 | 10/1989 | Banno et al. | 358/434 |

*Primary Examiner*—Edward L. Coles, Sr.
*Assistant Examiner*—Thomas D. Lee
*Attorney, Agent, or Firm*—Duane C. Basch; Ronald F. Chapuran

[57] ABSTRACT

The present invention is a system incorporating a modem in an xerographic machine, thereby enabling external data communication with a remote system, while concurrently executing normal xerographic control operations. Specifically, the reprographic features of the xerographic machine are fully enabled during communication with an external or host system. In addition, a means is provided to reset only the communication hardware and software within the system, without impacting the xerographic functionality of the system.

12 Claims, 6 Drawing Sheets

CONCURRENT MODEM CONTROL IN A REPROGRAPHIC MACHINE

This is a continuation of application Ser. No. 445,809, filed Dec. 4, 1989.

BACKGROUND OF THE INVENTION

1. Field of the Invention

This invention relates generally to the concurrent control of a xerographic reproduction machine and an internal modem within the xerographic reproduction system for the purpose of allowing external communications with a remote system while simultaneously providing full feature reproduction capability.

2. Description of the Prior Art

It is a generally known technique to incorporate a modem into office equipment or systems for the purpose of enabling direct communications with external or remote devices. It is, however, usually necessary that the equipment or systems incorporating the communication capability operate in a less than fully functional state in order to initiate and maintain communications with the remote devices. Unfortunately, this requirement may severely limit the functionality of the office equipment or systems during the communication sessions, thereby reducing the throughput or features available for the systems.

In order to improve the performance of systems incorporating such communicating capability, it is a widely used practice to reserve actual data communication sessions for off-peak usage times when reductions in system functionality or throughput will not adversely affect system operation. This delayed data communication concept has been widely used in facsimile systems not only to maximize operator efficiency, but also to take advantage of lower data transmission charges during certain periods of the day.

For example, U.S. Pat. No. 4,646,160 to Iizuka et al discloses a facsimile apparatus for transmitting/receiving image data. A first memory stores image data and a second memory stores external apparatus number and time data. Upon coincidence of stored time data and a time signal from a clock, the apparatus starts an automatic dialing mode to connect a line with an external apparatus.

The prior art also discloses means for recognizing and rectifying a fault within systems utilizing a modem for external communications. U.S. Pat. No. 4,112,467 to Ogawa discloses a failure mode control apparatus for electronic graphic data transmission systems. Failure or malfunction sensors are provided at the transmitter and receiver of facsimile machines to generate failure signals having the same frequency as a telephone network busy signal upon detection of a malfunction. Both the transmitter and receiver are reset at high speed to an initial ready for transmission status upon reception of a failure signal from either sensor and automatically disconnect from the telephone network.

U.S. Pat. No. 4,686,526 to Gritzo discloses a remote reset circuit which acts as a monitor and controller by clocking all characters sent by a terminal to a computer and comparing them to a reference character. When a match occurs, the remote reset circuit activates the system's hardware reset line. The reset circuit is hardware oriented and does not require software configuration or initialization.

U.S. Pat. No. 4,811,358 to Smedley et al. discloses a subscriber line interface modem for use in a telecommunication system. The modem comprises a bus interfacing means, channel means and clock supply means. The interface receives address data and control information from a microprocessor and dispatches information to the microprocessor for evaluation. The processing of information through the modem is controlled by a microprocessor in conjunction with clock signals generated by a clock supply means. The modem may be reset from three sources; a reset input, a software reset, and an individual channel reset.

The teachings of the prior art are focussed primarily on apparatus for providing external communications via a modem or similar means. The prior art also discloses examples of single function systems that utilize such means for external communication. However, the prior art does not disclose a means for external communications within a multi-function xerographic system. More specifically, the prior art does not disclose systems having multiple functions, including external communication capabilities, where the non-communication capabilities of the system are fully maintained during a communications session. It would be desirable, therefore, to provide a simultaneous capability of total multi-function operation and modem communication within a reproduction machine.

It is therefore, an object of the present invention to incorporate the capability for external communications into a multi-function, xerographic reproduction machine. It is a further object of the present invention to operate a modem, or similar external communication means, within a xerographic system in a concurrent fashion so as to avoid any interference with the normal reprographic functionality of the system. It is an additional object of the present invention to provide a method of resetting the external communication means when a fault state is detected without interruption of system reprographic functionality. It is a final objective of the present invention to enable the establishment of a remote communications link either as an initiator or as a receiver for the purpose of remote interactive communications (RIC) with a host computer or similar device and upon the termination of such a link, to cause the orderly shutdown of the entire reprographic machine to a power off state.

Further advantages of the present invention will become apparent as the following description proceeds and the features characterizing the invention will be pointed out with particularity in the claims annexed to and forming a part of this specification.

SUMMARY OF THE INVENTION

Briefly, the present invention is a system for incorporating a modem in an electrostatic reproduction device to enable external data communication while concurrently executing normal xerographic control operations. More specifically, reprographic features of the machine remain enabled during communication with an external or host system and a means is provided to reset only the communication hardware/software system, without impacting the reprographic functionality of the remainder of the xerographic system, should a communications error occur.

BRIEF DESCRIPTION OF THE DRAWINGS

For a better understanding of the present invention, reference may be had to the accompanying drawings wherein the same reference numerals have been applied to like parts and wherein.

DESCRIPTION OF THE PREFERRED EMBODIMENT

Figure 1:
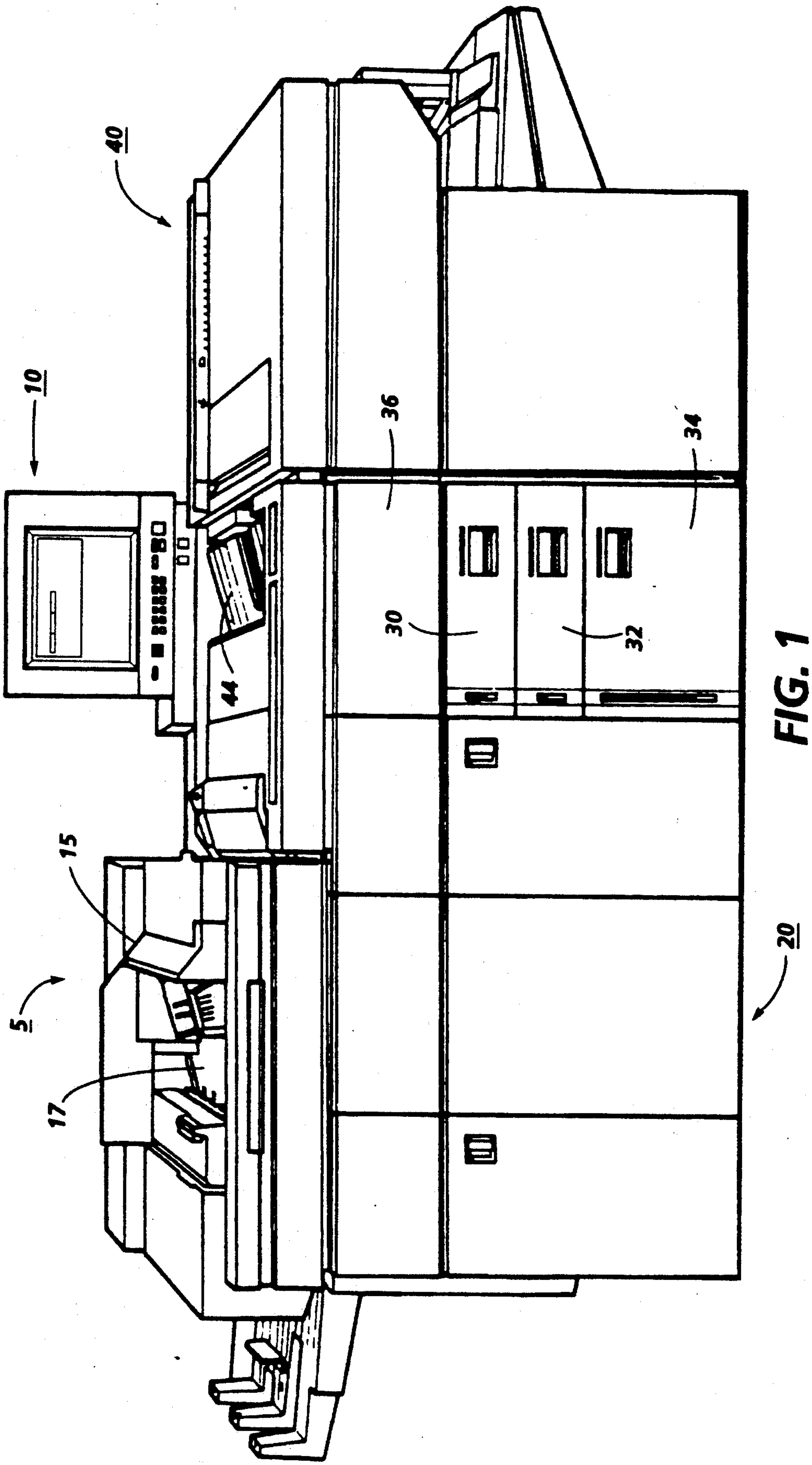
FIG. 1 is an isometric view of an illustrative xerographic reproduction machine incorporating the present invention.

For a general understanding of the features of the present invention, reference is made to the drawings. Referring to FIG. 1, there is shown a typical xerographic reproduction machine 5 composed of a plurality of programmable components and subsystems which cooperate to carry out the copying or printing job programmed through a User Interface (U/I) 10.

A document handling unit 15 sequentially feeds documents from a stack of documents (not shown) in document tray 17 into an imaging position beneath document handling unit 15. After imaging, the documents are returned to document tray 17 via simplex or duplex copy paths (not shown) within document handling unit 15.

Imaging of the original documents occurs within the xerographic module 20, where the original document, on the platen, is exposed to create a latent image on a photoreceptor (not shown). Subsequently, the latent image is developed and transferred, within xerographic module 20, to a copy sheet which has been fed from one of the copy sheet trays 30, 32 or 34.

Following transfer, the image is permanently affixed to the copy sheet which is subsequently advanced to either finishing module 40, top output tray 44 or to a duplex storage module 36, for the first image on a duplex copy sheet. Options available within finishing module 40 are collation, stapling, and slip sheet insertion from copy sheet trays 30, 32 or 34.

Figure 2:
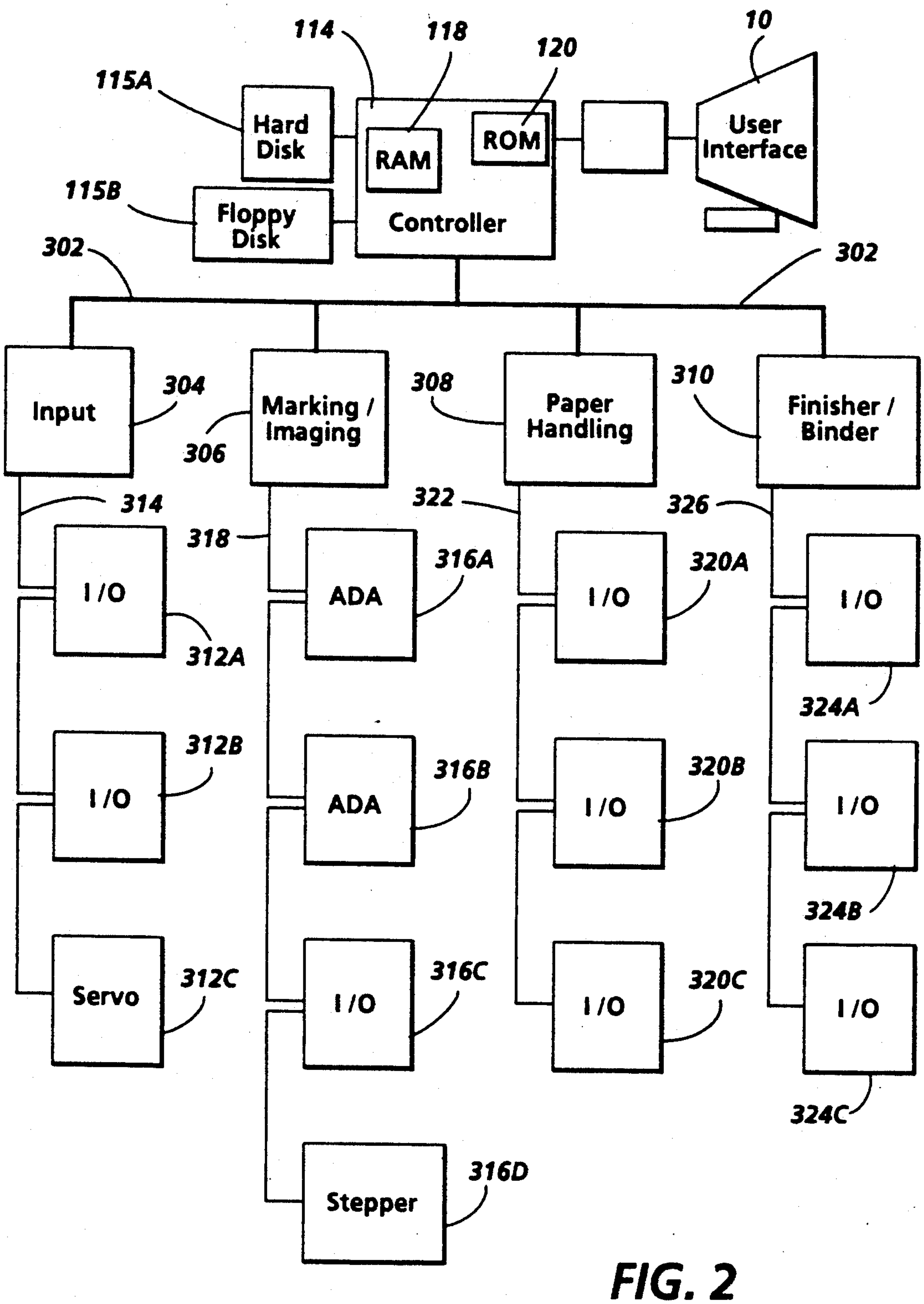
FIG. 2 is a detailed block diagram of the xerographic control systems and memory for the machine of FIG. 1.

With reference to FIG. 2, the various functions of machine 5 of FIG. 1, are regulated by a Controller Unit 114 which is comprised of memories 118 and 120, and one or more programmable microprocessors (not shown). The controller provides a comparison count of the copy sheets, the number of documents being recirculated, the number of copies selected by the operator, time delays, and jam corrections. Programming and operating control over machine 5 is accomplished through U/I 10. Operating and control information is stored in a suitable memory 115A,B and loaded into Controller Unit 114 through U/I 10. Conventional sheet path sensors or switches, such as photocells or reed switches, may be utilized to keep track of the position of the documents and the copy sheets. In addition, the controller regulates the various positions of the mechanical gates used to control document and paper travel, depending upon the mode of operation selected.

Memory includes a hard or rigid disk drive 115A for receiving suitable rigid memory disks and a floppy disk drive 115B for receiving suitable floppy memory disks, both disk drives being electrically connected to Controller Unit 114, including RAM 118 and ROM 120. In normal machine operation, all of the control code and screen display information for the machine is loaded from the rigid disk at machine power up. Altering the data loaded into the machine for execution can be done by exchanging the rigid disk in machine 5 for another rigid disk with a different version of data. In addition, all of the control code and screen display information for the machine can be loaded from a floppy disk at machine power up using the floppy disk drive built into the machine 5. U/I 10 is also connected to Controller Unit 114 as well as a shared line system bus 302.

The shared line system bus 302 interconnects a plurality of core printed wiring boards including an input station board 304, a Marking/Imaging board 306, a Paper Handling board 308, and a Finisher/Binder board 310. Each of the core printed wiring boards is connected to local input/output devices through a local serial bus. For example, the Input station board 304 is connected to digital input/output boards 312A and 312B and servo board 312C via local bus 314. The Marking/Imaging board 306 is connected to analog/digital/analog boards 316A, 316B, digital input/output board 316C, and stepper control board 316D through local bus 318. In a similar manner, the Paper Handling board 308 connects digital input/output boards 320A, B and C to local bus 322, and Finisher/Binder board 310 connects digital input/output boards 324A, B and C to local bus 326.

Figure 3:
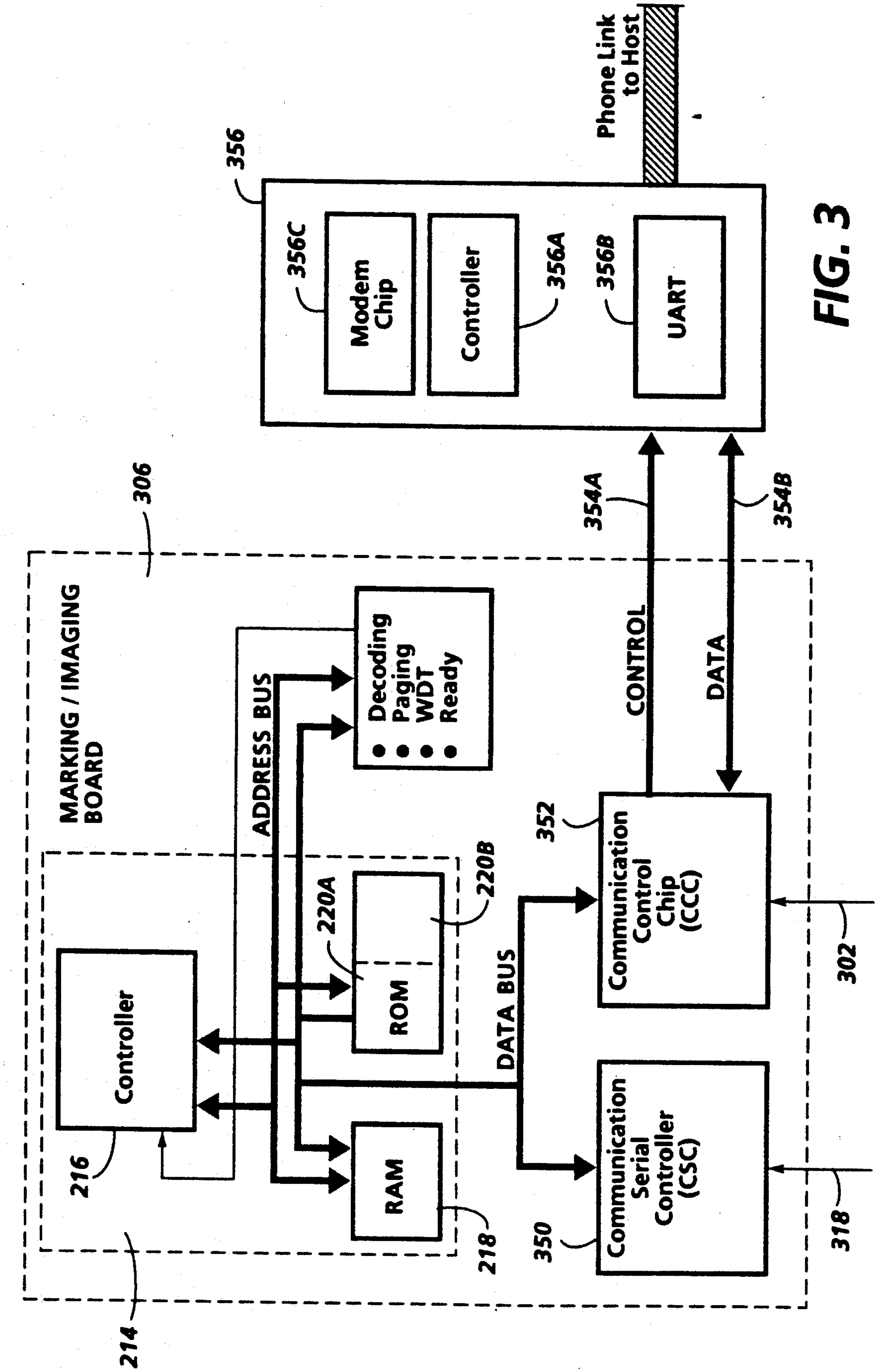
FIG. 3 is a detailed block diagram of the communications hardware for the machine of FIG. 1.

With reference to FIG. 3, Marking/Imaging board 306, contains a Controller Unit 214 comprised of memories 218, 220A,B and programmable microcontroller 216. Controller Unit 214 is linked to additional devices and input/output boards through local serial bus 318, as controlled by Communication Serial Controller (CSC) 350 which acts as the master communications controller for all connected nodes on serial bus 318. Similarly, Communication Control Chip (CCC) 352 acts as the communication link for the inter-processor communications via the shared line system bus 302.

As an additional function, CCC 352 can act as an interface to other devices requiring system inputs and/or outputs. Specifically, in accordance with the present invention, on the Marking/Imaging board 306, the CCC can be utilized as the interface to Modem 356 via an RS-232 type interface connection 354A, B, to enable external communications with a remote host computer or other such system.

Modem 356 is comprised of a microcontroller 356A, a universal asynchronous receiver-transmitter (UART) 356B, and a modem chip 356C which provide the modem functionality. Microcontroller 356A is a programmable device capable of initiating a set of predefined commands using modem chip 356C, as provided by the Marking/Imaging programmable microcontroller 116.

Modem 356 is intended to act as the physical interface between Marking/Imaging board 306 and the external phone line to the host system. In addition to the typical RS-232 interface, control lines 354A contain a reset line intended to allow the hardware reset of the modem. This hardware feature enables the non-power off resetting of the modem interface, via CCC 352, in the event of a modem or communications fault, thereby eliminating any impact on the xerographic functionality of the system.

Functional control of the system is accomplished using a two layered software architecture implemented using the multi-processor system. Specifically, the system software, as contained in ROM 120, is divided into an application, or client layer and an operating system. The application layer software (APPS) is used to provide the high level functionality of the system, primarily through the use of operating system tasks.

The operating system (O/S) layer acts as an interface between the system hardware and the application layer. In addition, the O/S layer is responsible for operation and control of the multi-tasking environment. In accordance with the present invention, the multi-tasking portion of the operating system comprises the scheduling of tasks to achieve system functionality and overall optimum system performance. Specifically, the O/S layer is responsible for enabling or unsuspending tasks which have all resources required for execution currently available. Conversely, the O/S layer will also disable, or suspend, those tasks which are awaiting the completion of a hardware or software event. Optimal performance of the system is achieved when the operating system is able to schedule the execution of tasks in a manner to achieve maximum use of the system processing capabilities.

Specifically associated with any Remote Interactive Communications (RIC) task is a requirement that only a single RIC task be operating or pending at any time. This requirement is due to the fact that the hardware system or modem employed during a RIC task can only execute one operation at a time. For this reason, the operating system includes the ability to monitor RIC task requests and to inhibit or suspend subsequent RIC tasks when the modem hardware is inoperable due to a previous RIC task request.

Figure 4:
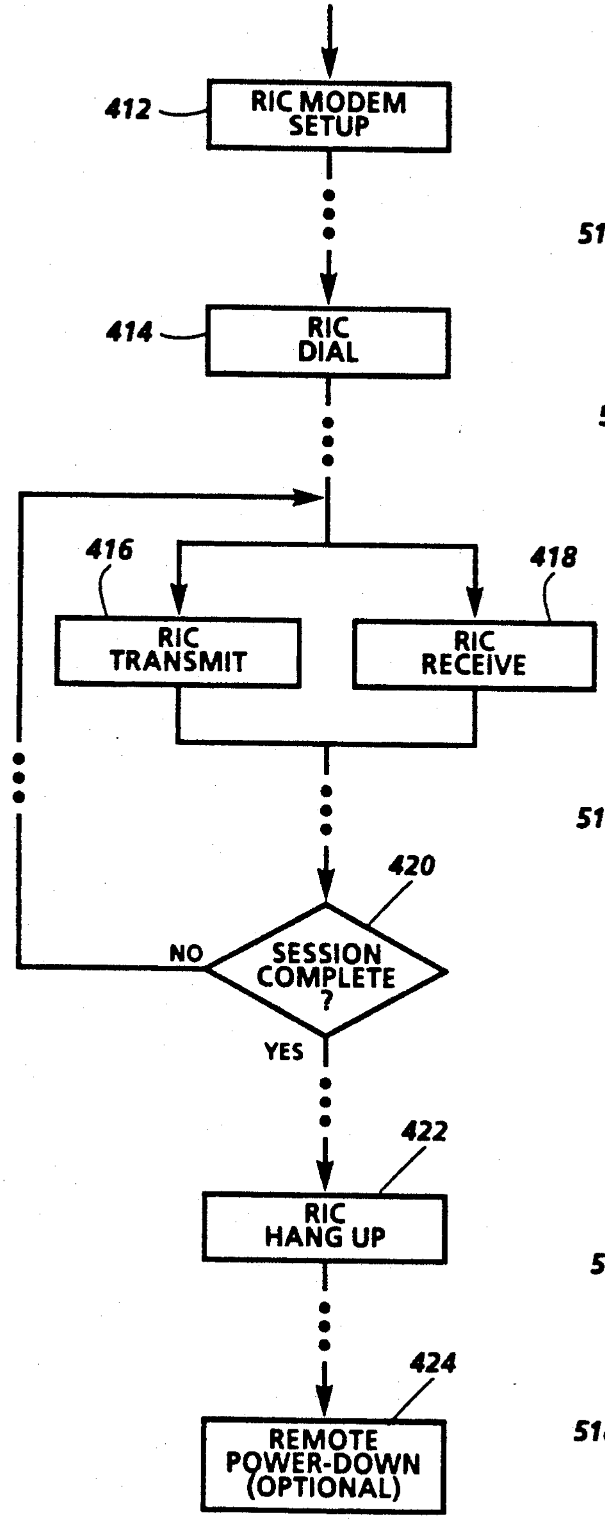
FIG. 4 is a flowchart of a typical reprographic machine communication session with a remote host.

Referring now to FIG. 4, which depicts a flowchart of a typical Remote Interactive Communications (RIC) session from the perspective of the xerographic system. In accordance with the present invention, the multitasking operating system is responsible for controlling multiple APPS layer and O/S layer tasks in a concurrent manner. For this reason, the processes illustrated by the blocks of FIG. 4 are connected by dotted lines which are intended to represent the possibility of additional system tasks occurring in either a simultaneous or interwoven fashion with the illustrated tasks.

The RIC session depicted in FIG. 4 shows the initiation of the session as a result of the RIC Modem Setup block 412. Operations executed during this task comprise hardware and software resets to Modem 356 of FIG. 3. Also included in RIC Modem Setup block 412 are the operations of initialization of receive buffer memory pointers and initialization of the Modem control registers which control modem operation such as the number of rings before the modem will answer the phone.

Primarily, the RIC Modem Setup task is implemented through an operating system operation whenever it is invoked by the APPS software layer. Typically, the RIC Modem Setup task is invoked at power-up to assure proper modem initialization. Should Modem 356 of FIG. 3 not be functional, an error status would be returned from Modem 356 and would then be passed to the APPS layer from the O/S layer. The RIC Modem Setup task is also used when an indeterminate state exists within the modem control software and it is desirable, for the applications layer, to cause the hard reset and re-initialization of Modem 356.

Once initialized, using the RIC Modem Setup command, Modem 356 of FIG. 3 is available to transmit or receive data. Initiation of data transmission is enabled by a RIC command issued by the application software layer. However, initiation of a communication session by a remote system comprises recognition of a request from the remote system, establishment of the physical communications link, and subsequent reception and/or transmission to the remote system. Therefore, initiation of any communication session must be preceded by the RIC Modem Setup process.

Following initialization of Modem 356 of FIG. 3 in RIC Modem Setup task block 412, Modem 356 is ready for initiation of a communication session to be established by RIC Dial task, block 414. At the APPS layer, the RIC Dial task is intended to invoke a process to dial the phone number of a remote system and to open a communication channel to the remote system. Invocation of the RIC Dial task by the application layer includes the definition of parameters associated with the Phone Number and the Ring Time, the time to wait for an answer by the remote system.

Figure 5A:
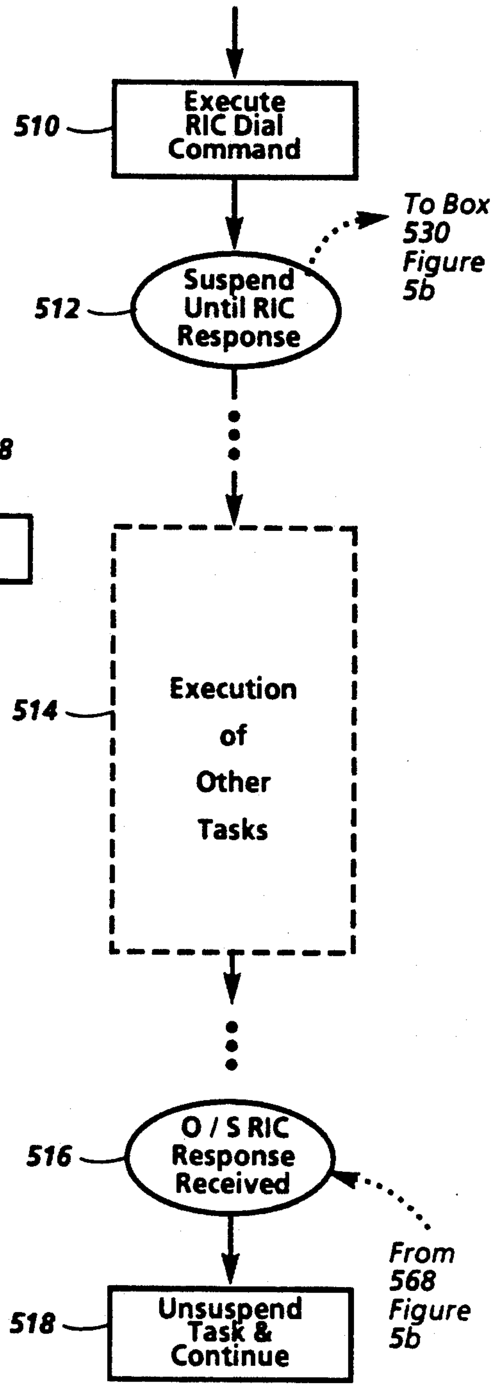
FIGS. 5*a* and 5*b* are detailed flowcharts of the multitasking operation of the RIC Dial process of FIG. 4.
Figure 5B:
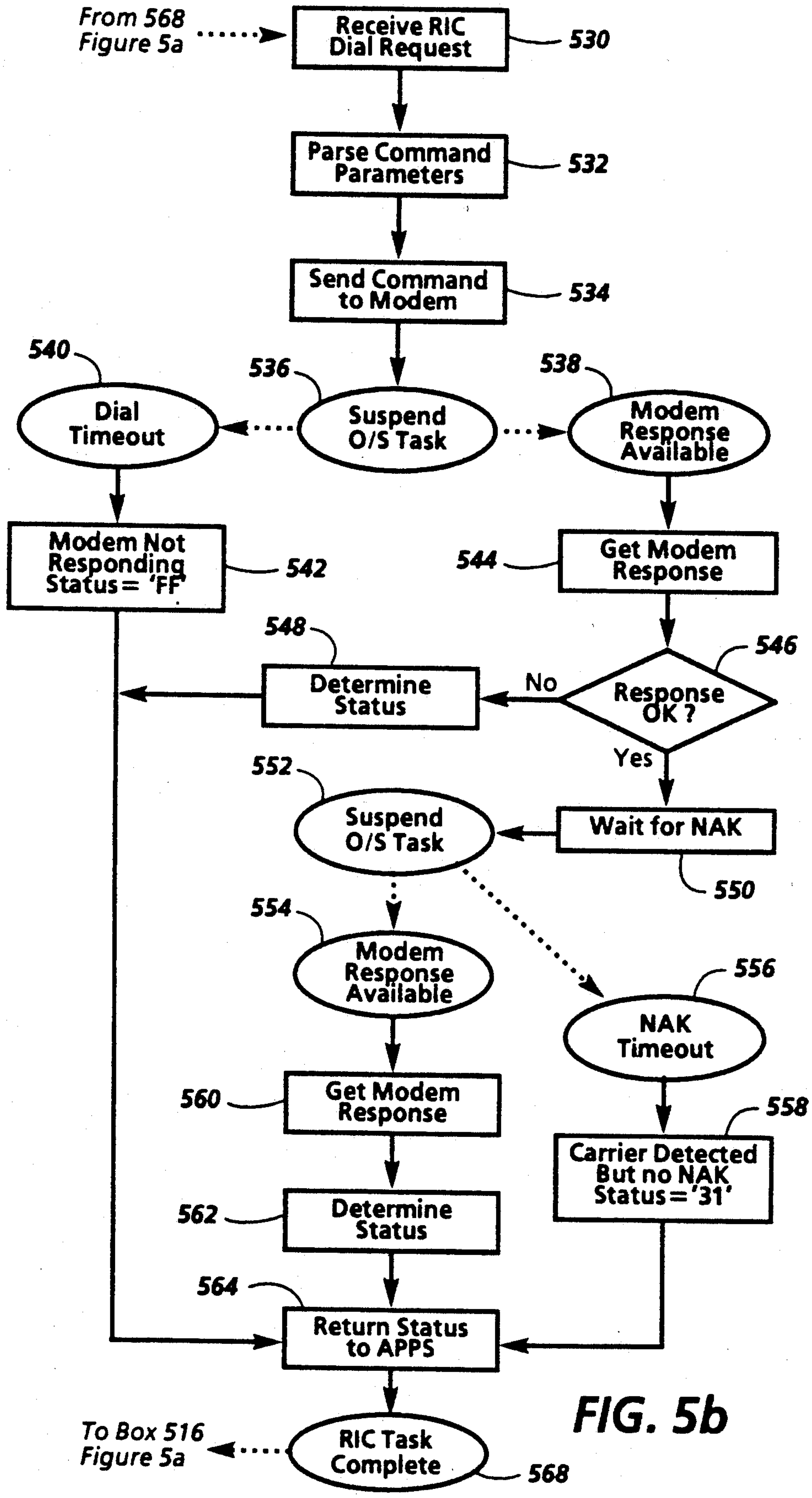

The RIC Dial task is illustrated from both the APPS layer and O/S layer perspectives in FIGS. **5*a* and 5*b* respectively. Referring specifically to FIG. 5*a*, the APPS layer requests the task by executing the RIC Dial command, block 510. Subsequently, the command is passed to the operating system for processing and the APPS layer task is suspended, block 512**, until the RIC Dial task is complete.

While the RIC Dial task is suspended within the APPS layer, other pending tasks may be executed, as indicated by block 514, providing that the required system resources are available. Upon completion of the RIC Dial operations within the operating system, a response will be passed back to the application layer signaling completion, block 516. When the signal is received, the APPS layer task is unsuspended and the operation that required the RIC Dial task is allowed to continue execution, block 518.

Referring now to FIG. **5*b*, the first operation of the operating system upon receipt of a command, block 530, is to parse the command, block 532, to determine what task has been requested by the APPS layer. Subsequent to determining that a RIC operation has been requested, the parameters associated with the command are also parsed from the data sent from the APPS layer. Next, a command is prepared and sent to Modem 356 of FIG. 3, to initiate a dialing sequence to a remote host. Upon sending the command to Modem 356, the O/S task is temporarily suspended, block 536, until a time when a response is received from Modem 356, block 538, or a previously specified period of time has elapsed without any response, block 540. Should a timeout period elapse, as detected in block 540, the operating system will declare an error by setting the Dial Status to 'FF' hex, block 542, return the status to the APPS layer, block 564, and signal that the operating system task is complete via block 568**.

If, however, a modem response is detected at block 538, the operating system will retrieve the response, block 544, from Modem 356 and will determine if a connection was established, block 546. If not, an appropriate status will be determined, block 548, and returned to the APPS layer. If the connection was established, the operating system will wait for a signal (NAK) from the remote system, block 550, again suspending the task at block 552 until a response or timeout event occurs as recognized in blocks 554 and 556 respectively.

As is the case for all RIC operations, if a response is not received from the Modem in a specified period of time, the operating system will declare a timeout event. Specifically, in block 556, the timeout event will indicate the occurrence of the NAK timeout by setting the Dial Status to '31' hex, block 558, and return the status to the APPS layer. If a response is received from the modem, block 554, the operating system will retrieve the response, block 560, and parse the response to determine the modem status, block 562. Subsequently, the operating system will return the status to the APPS layer, block 564, and signal the completion of the RIC operating system task, block 568.

In accordance with the present invention, the RIC Dial operating system tasks enable the establishment of a communication link with a remote system and allow for the return of a status to the application layer. Also, in the event of an error, the operating system will indicate the nature of the error using the RIC Dial status returned to the application layer.

Figure 6A:
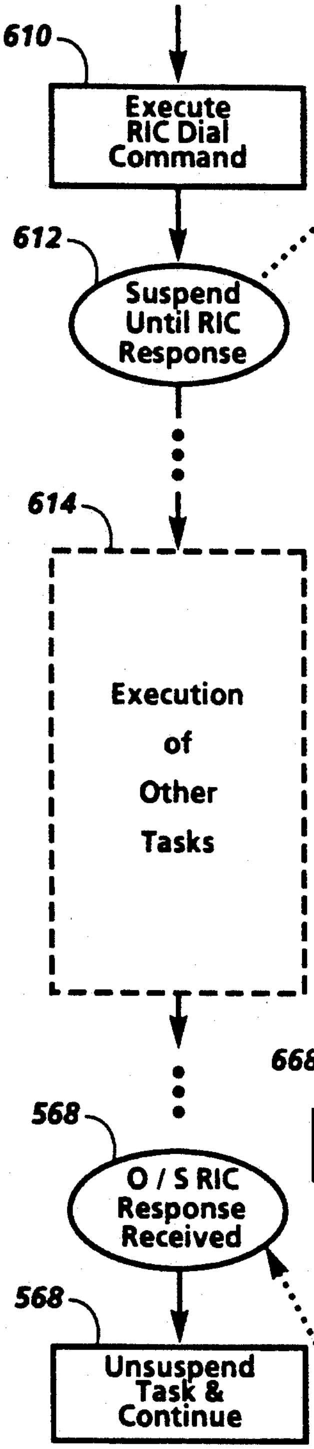
FIGS. 6*a* and 6*b* are detailed flowcharts of the multitasking operation of the RIC Transmit process of FIG. 4.

The RIC Transmit task, block 416 of FIG. 4, is intended to provide the applications layer with the ability to send data to a remote system via an established communications link. Referring to FIG. 6*a*, the RIC Transmit (RIC Xmit) task is initiated at the APPS layer by passing a RIC Xmit command to the operating system, block 610, and suspending the calling task, block 612, until a response is received from the operating system layer, block 616. As is the case for all operating system tasks, once the RIC Xmit command is issued, the current APPS layer task is suspended, allowing execution of additional APPS layer tasks while completion of the RIC task is pending, as indicated by block 614.

Generally, the RIC Transmit task is implemented within the operating system, where a data pointer from the application layer is used to identify the data string for transmission. Within the operating system layer, the data string is combined with certain protocol information to form a packet for transmission via the communication link and Modem 356 of FIG. 3. Subsequent to transmitting the data string, the operating will suspend the communication task to wait for an acknowledgement (ACK) from the remote system. Should a transmission error occur, the remote system would return a No-acknowledgement (NAK) indicating that a message was received but an error was detected.

Figure 6B:
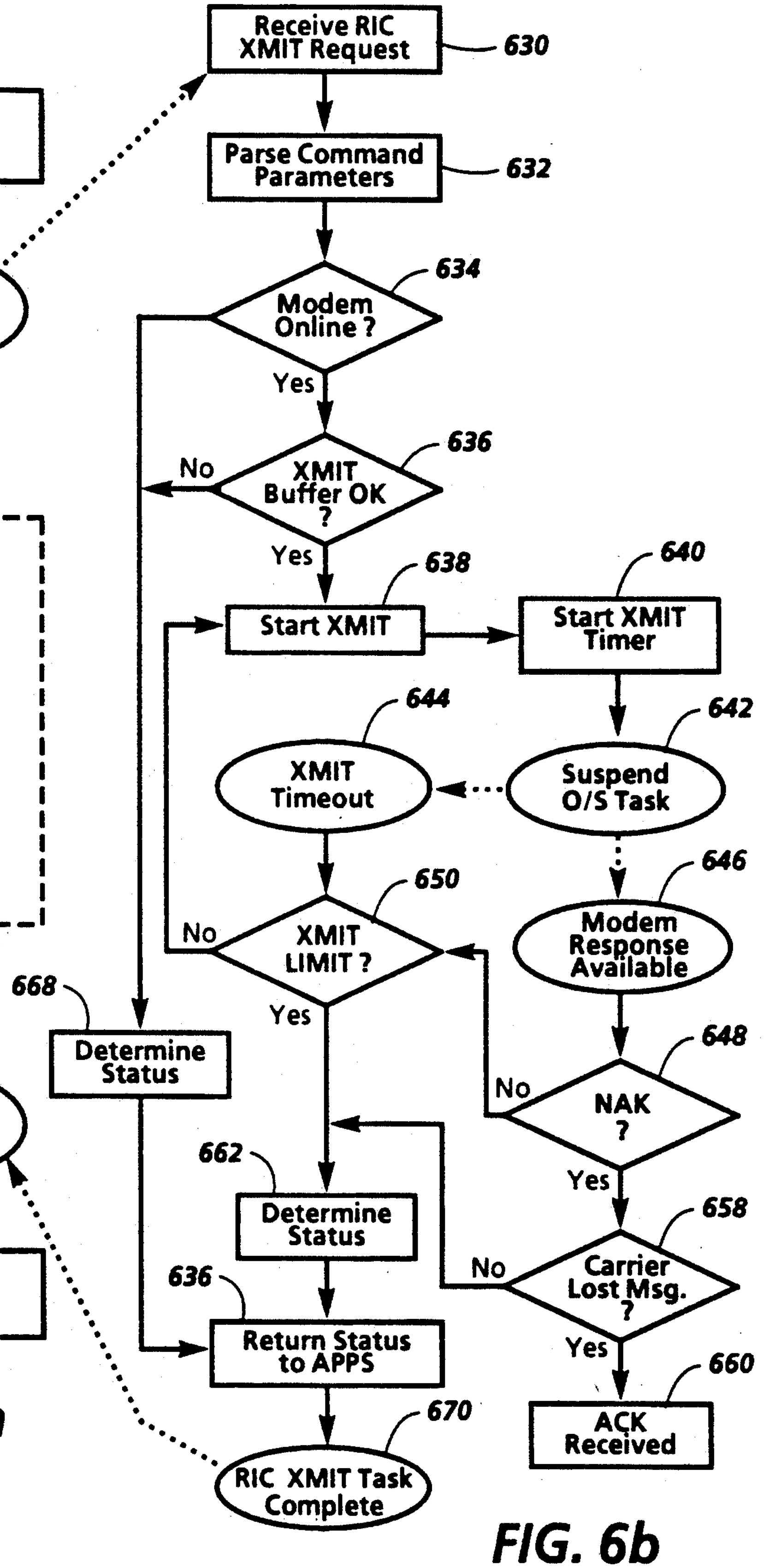

Referring specifically to FIG. 6*b*, the operating system initially receives the RIC Xmit command, block 630, and subsequently parses the command data, block 632, to determine the associated command parameters. Transmission of data to a remote system requires that Modem 356 of FIG. 3 be in an "Online" state which is determined by test block 634. In addition, the operating system checks the status of the RIC Xmit buffer, block 636, identified by a memory pointer passed from the APPS layer as a command parameter. Should either test block, 634 or 636, indicate a problem, a status will be determined, block 668, and returned to the APPS layer, block 664. Should the modem and RIC Xmit buffer be operational, the operating system will send a data string to the modem for transmission to the remote system, block 638, and start the transmission timer, block 640. The operating system will subsequently suspend the task pending a response from the modem, block 646, or an indication that the Xmit timeout period has elapsed, block 644.

If a response is received from the modem, block 646, the response data is initially checked to determine if a NAK or No-Acknowledgement response has been returned, block 648. A NAK response from the remote system is an indication that data was received but that a data error was detected by a predetermined error detection operation based on the communication protocol, used between the xerographic system and the remote system.

A NAK response, as detected in block 648, or a Xmit timeout event, block 644, will cause the operating system to check the number of times that the current message has been transmitted previously. The Xmit limit test, test block 650, compares the number of times the current message has been unsuccessfully transmitted to determine if further transmissions, as initiated in block 638, are warranted. Should additional transmissions be allowed, the operating system process continues at block 638 as previously described. If, however, the Xmit limit has been reached, a status indicative of the RIC Xmit limit will be determined, block 662, and returned to the APPS layer, block 664, thus signaling the unsuccessful completion of the RIC Xmit task, block 670.

If the modem response, as received in block 646, is not a NAK, a second test is used to determine if the response was a "carrier lost" message from the modem, block 658. A "carrier lost" response from the modem is indicative of a problem with the communication link to the remote system. As before, the operating system will identify the modem condition in the status returned to the APPS layer, thereby, indicating the unsuccessful completion of the RIC Xmit task.

Finally, if the modem response received in block 646 is neither a NAK or a "carrier lost" response, it is assumed to be an ACK response, block 660. The ACK response is regarded as a signal from the receiving system to the transmitting system that the data has been successfully received and that further transmissions may occur. Subsequently, the successful completion of the transmission is indicated by the status, block 662, returned to the APPS layer, block 664. Finally, the operating system layer will signal completion of the task, block 670, so that the APPS layer task may continue.

Once again, referring to FIG. 4, a communication session may involve multiple iterations of the RIC Transmit and/or RIC Receive tasks, blocks 416 and 418 respectively. The end of a communication session with a remote system is determined within the application layer by the successful transmission or reception of an End of Transmission (EOT) message. As indicated by block 420, a test is conducted at the end of each RIC receive task to determine if the last message passed to the application layer was an EOT message. Also, after the RIC Transmit task is used to transmit an EOT message, a test is conducted to determine if the transmission was successful based upon the status returned from the operating system layer.

Next, communication session is terminated by the APPS layer using the RIC Hang Up task, block 422. In response to the applications layer command, the operating system first sends a command to Modem 356 of FIG. 3, to hang up or disconnect the phone line connection with the remote system. Next, the operating system suspends its task, waiting for a response from the modem indicating the status of the hang up request. Upon receipt of the status from Modem 356 of FIG. 3, the operating system unsuspends the task, determines the modem status and subsequently passes the status to the application layer.

Upon receipt of the RIC Hang Up task status from the operating system, the application layer unsuspends the current task and checks for successful completion of the RIC Hang Up task. If successful, the application layer will continue normal operation. If an error is indicated by the RIC Hang Up task status returned from the operating system, the application layer may choose to invoke a RIC Modem Setup task, similar to that described for block 412, to cause a reset of the modem, which will automatically disconnect the remote phone link.

Finally, in accordance with the present invention, the application layer may optionally invoke a Remote Power-Down task, block 424, as a result of the RIC communication session. This task will cause the operating system to begin the orderly shutdown of the xerographic system. The operations involved include, but are not limited to, completing currently running copying operations, preserving all required data in non-volatile memory, and shutting off power to the system. Operation of the system subsequent to a Remote Power-Down task would require the operator to toggle the system power switch, first to an off position and then to an on position.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

We claim:

1. In a reproduction machine having a controller with a first control element, having a memory, for coordinating the operation of various electrophotographic machine components to produce images on support media in response to an original document placed at an imaging position, and in accordance with programmed job requirements, and a second control element for coordinating communications with a host computer over a communication network, the method of simultaneously controlling the operation of the electrophotographic machine components and communicating with the host computer over the communication network comprising the steps of:

initiating the operation of the electrophotographic machine components in response to the programmed job requirements, sending machine operating information stored in the memory to the remote host, and continuing the independent operation of the electrophotographic machine components while simultaneously communicating with the host computer over the communication network.

2. The method of claim 1 further including the steps of:

recognizing an error in the communication with the host computer, and subsequently resetting the second control element to automatically enable further communication with the host computer.

3. A reprographic system having a controller and associated memory to control the operation of the system in order to produce an electrophotographic representation of an original document introduced into the system, comprising:

means, responsive to the controller, for establishing communications with a remote computer system at a predefined time, means for carrying out a communication session with the remote computer system to facilitate the transfer of data relating to the reprographic system between the controller memory and the remote computer system, and means, responsive to a signal from the controller, for executing an orderly shutdown of said reprographic system upon detection of the completion of said communication session, including means for assuring the completion of any electrophotographic processes in progress, and means for interrupting power to the reprographic system, thereby resulting in a power off condition.

4. In a reprographic system having a controller, a means for communicating externally with a remote system, and a power source, the controller having the capability to interrupt the supply of power from the power source to the system and enable an orderly shutdown of the system, the method of automatically causing the orderly shutdown of the reprographic system comprising the steps of:

establishing communications with the remote system, recognizing the system requirement for a shutdown based on the completion of communications with said remote system, completing any currently executing copying jobs, storing required system information in non-volatile memory, and disconnecting the power source to the reprographic system, in order to disable further use until a manual reset operation is completed.

5. A reprographic system for producing an electrophotographic copy of an original document introduced into the system in accordance with a given job requirement, comprising:

control means for controlling the operation of the reprographic system to provide the job requirement, wherein the control means includes, memory for storing control software and system operating information, a plurality of controllers, whereby each controller regulates the operation of one or more electrophotographic components within the reprographic system in accordance with the control software, system operating information, and the job requirement, and a bus system, interconnecting the controllers to provide a communications link therebetween, enabling the controllers to transfer and receive data indicative of the system state, thereby operating in conjunction to control the operation of the reprographic system, means, operating independent of said control means, for communicating with a remote computer system; and means, responsive to the control means, for concurrently controlling said reprographic system to provide the job requirement and communication with the remote computer system.

6. The reprographic system of claim 5, wherein the communicating means includes:

a modem suitable for communicating with a remote computer system;

a communications link to the remote computer system; and a communications control interface between the control means and the modem, said interface acting to parse the inter-controller communications on the bus system and to pass control and data signals to the modem in accordance with all bus communications intended for the modem.

7. The reprographic system of claim 6, wherein the modem comprises:

a microcontroller suitable for executing a set of predefined control commands;

a universal asynchronous receiver-transmitter; and a modem chip capable of buffering incoming and outgoing data received from the universal asynchronous receiver-transmitter and the communications control interface, said modem chip operating in conjunction with the microcontroller to parse and execute control commands passed from the control means.

8. The reprographic system of claim 5, wherein the remote computer system is a device for monitoring the operation of the reprographic system.

9. In an electrophotographic copying system having a multi-tasking environment for the control of system resources, including a distributed network of controllers for the regulation of a plurality of electrophotographic components within the electrophotographic copying system and a communications controller capable of independently regulating the transfer of operating information between the copying system and a remote host, the method of simultaneously controlling the electrophotographic and communications functions of the copying system, including the steps of:

monitoring the electrophotographic components to determine a status thereof;

scheduling the operation of the electrophotographic components in response to the user input of a set of selected job requirements, and in accordance with the electrophotographic component status;

simultaneously scheduling the establishment of communications with the remote host over an external communication link to enable the transfer of operating information stored within the system; and controlling the multi-tasking environment so as to permit the execution of those tasks not awaiting system resources which are presently in use, while suspending those tasks in need of system resources which are currently in use.

10. The method of claim 9, further including the steps of:

detecting an error in communication with the remote host; and automatically resetting the communications controller to enable the reestablishment of subsequent communications with the remote host.

11. The method of claim 10, wherein the step of automatically resetting the communications controller further includes the steps of:

causing a hardware reset of the communications controller; and reinitializing the communications controller, thereby returning the controller to a known condition suitable for executing communications instructions provided by the multitasking environment.

12. The method of claim 9, wherein the step of simultaneously scheduling the establishment of communications with the remote host includes the steps of:

scheduling a communications task to establish remote communications;

when available, allocating system resources required for execution of the communications task;

monitoring the status of the communications task to determine when communications have been established with the remote host;

transferring information relative to the operation of the electrophotographic components to and from the remote host;

determining when the information transfer has been completed;

reporting the status of the communications task to the multi-tasking environment; and freeing system resources used by the communication task for subsequent use by other system tasks.

* * * * *